United States Patent [19]

Moberg

[11] Patent Number: 5,181,212
[45] Date of Patent: Jan. 19, 1993

[54] METHOD OF EMITTING ON A SPECIFIC WAVELENGTH FRAUNHOFER LINE USING A NEODYMIUM DOPED LASER TRANSMITTER

[75] Inventor: Victor L. Moberg, San Diego, Calif.
[73] Assignee: The United State of America as represented by the Secretary of the Navy, Washington, D.C.
[21] Appl. No.: 816,514
[22] Filed: Dec. 31, 1991
[51] Int. Cl.[5] .............................................. H01S 3/10
[52] U.S. Cl. ...................................... 372/22; 372/21; 372/29; 372/23; 372/109
[58] Field of Search ...................... 372/3, 4, 5, 10, 21, 372/22, 23, 34, 33, 102, 109, 70, 75; 359/326, 327, 329, 334, 180

[56] References Cited

U.S. PATENT DOCUMENTS

| | | | |
|---|---|---|---|
| 3,611,231 | 10/1971 | Burke | 372/22 X |
| 4,044,316 | 8/1977 | Kennedy | 372/22 X |
| 4,144,464 | 3/1979 | Loree et al. | 372/22 X |
| 4,327,337 | 4/1982 | Liu | 372/21 |
| 4,618,783 | 10/1986 | Pradere et al. | 372/3 X |
| 4,745,606 | 5/1988 | Uehara et al. | 372/29 |
| 4,764,933 | 8/1988 | Kozlovsky et al. | 372/22 X |
| 4,809,291 | 2/1989 | Byer et al. | 372/75 |
| 4,841,528 | 6/1989 | Sibes, Jr. et al. | 372/22 |
| 4,872,177 | 10/1989 | Baer et al. | 372/75 |
| 4,876,688 | 10/1989 | Wang et al. | 372/21 |
| 4,987,376 | 1/1991 | Hughes | 372/22 X |
| 5,088,096 | 2/1992 | Pocholle et al. | 372/21 X |
| 5,123,026 | 6/1992 | Fan et al. | 372/75 |
| 5,130,996 | 7/1992 | Amano et al. | 372/22 X |

OTHER PUBLICATIONS

"Neodymium: Glass Laser System with a Large Tuning Range", by U. Czarnetzki and V. Schulz-von der Gathen, *Applied Optics*, vol. 25 (17), Sep. 1, 1986, pp. 2912-2914.

"Intensity and Gain Measurements on the Stimulated Raman Emission in Liquid $O_2$ and $N_2$", by J. B. Grun et al., *Physical Review*, vol. 180 (1), Apr. 5, 1969, pp. 61-68.

"High-Power Tunable IR Rman Lasers," by A. Grasiuk and I. Zubarev, *Applied Physics*, vol. 17, 1978, pp. 211-232.

"422.7-nm Atomic Filter with Superior Solar Background Rejection", by J. Gelbwachs, *Optics Letters*, vol. 15 (4), Feb. 15, 1990, pp. 236-238.

"High Temperature Spectroscopic Investigation of Stimulated Emission From Lasers Based on Crystals and Glasses Activated With $Nd^{3+}$Ions", by A. Kaminskii, *Soviet Physics JETP*, vol. 27, No. 3, Sep. 1968, pp. 388-399.

"Linewidths and Thermal Shifts of Spectral Lines in Neodymium-Doped Yttrium Aluminum Garnet and Calcium Fluorophosphate", by Takashi Kushida, *Physical Review*, vol. 185, No. 7, Sep. 10, 1969, pp. 500-508.

"Stimulated Raman Shifting of the Nd:YAG Fourth Harmonic (266 nm) in $H_2$, HD, and $D_2$", by D. Haner and I. McDermid, *IEEE Journal of Quantum Electronics*, vol. 26, No. 7, Jul. 1990, pp. 1292-1298.

"Generation of Infrared Radiation by Raman Scattering and Difference Frequency Mixing with a Nd:YAG Pump", by J. Meadors and M. Poirier, *IEEE Journal of Quantum Electronics*, vol. QE-8 (4), Apr. 1972, pp. 427-428.

"1.05-1.44 um Tunability and Performance of the CW $Nd^{3+}$:YAG Laser", by J. Marling, *IEEE Journal of Quantum Electronics*, vol. QE-14 (1), Jan. 1978, pp. 56-62.

"Tunable Far-Infrared Raman Generation", by R. Frey, et al., *Optics Communications*, vol. 23, No. 1, Oct. 1977, pp. 65-68.

*Primary Examiner*—Brian Healy
*Attorney, Agent, or Firm*—Harvey Fendelman; Thomas Glenn Keough

[57] ABSTRACT

A method of emitting on a specific wavelength Fraunhofer line of peak seawater transmission and minimum solar radiation is disclosed. This method includes the steps of emitting at least on a specific wavelength of an infrared transition line from a neodymium gain element in an optical resonator; frequency tripling the infrared line from the resonator to a specific ultraviolet wavelength in a frequency multiplier; and Raman down shifting the specific ultraviolet wavelength a predetermined degree by a predetermined number of Stokes shifts in a predetermined medium in a Raman shifter to produce a high peak-power output at the specific wavelength Fraunhofer line.

17 Claims, 5 Drawing Sheets

```
┌─────────────────────────────────────────┐
│   EMITTING AT 10614.6531 ANGSTROM       │
└─────────────────────────────────────────┘
                    │
                    ▼
┌─────────────────────────────────────────┐
│ FREQUENCY TRIPLING TO 3538.2177 ANGSTROM│
└─────────────────────────────────────────┘
                    │
                    ▼
┌─────────────────────────────────────────┐
│ RAMAN SHIFTING 4654 cm⁻¹ TO SECOND STOKES│
│         IN NITROGEN TO OUTPUT ON         │
│  4235.950 ANGSTROM IRON FRAUNHOFER LINE  │
└─────────────────────────────────────────┘
```

*FIG. 12*

```
┌─────────────────────────────────────────┐
│   EMITTING AT 10613.9019 ANGSTROM       │
└─────────────────────────────────────────┘
                    │
                    ▼
┌─────────────────────────────────────────┐
│ FREQUENCY TRIPLING TO 3537.9673 ANGSTROM│
└─────────────────────────────────────────┘
                    │
                    ▼
┌─────────────────────────────────────────┐
│ RAMAN SHIFTING 4656 cm⁻¹ TO THIRD STOKES │
│          IN OXYGEN TO OUTPUT ON          │
│  4235.950 ANGSTROM IRON FRAUNHOFER LINE  │
└─────────────────────────────────────────┘
```

*FIG. 13*

```
┌─────────────────────────────────────────┐
│   EMITTING AT 10615.8027 ANGSTROM       │
└─────────────────────────────────────────┘
                    │
                    ▼
┌─────────────────────────────────────────┐
│ FREQUENCY TRIPLING TO 3538.6009 ANGSTROM│
└─────────────────────────────────────────┘
                    │
                    ▼
┌─────────────────────────────────────────┐
│ RAMAN SHIFTING 5832 cm⁻¹ TO SECOND STOKES│
│          IN METHANE TO OUTPUT ON         │
│   4459.1 ANGSTROM IRON FRAUNHOFER LINE   │
└─────────────────────────────────────────┘
```

*FIG. 14*

```
┌─────────────────────────────────────────┐
│   EMITTING AT 10613.049 ANGSTROM        │
└─────────────────────────────────────────┘
                    │
                    ▼
┌─────────────────────────────────────────┐
│ FREQUENCY TRIPLING TO 3537.683 ANGSTROM │
└─────────────────────────────────────────┘
                    │
                    ▼
┌─────────────────────────────────────────┐
│ RAMAN SHIFTING 8973 cm⁻¹ TO THIRD STOKES │
│         IN DEUTERIUM TO OUTPUT ON        │
│5183.64 ANGSTROM MAGNESIUM FRAUNHOFER LINE│
└─────────────────────────────────────────┘
```

*FIG. 15*

METHOD OF EMITTING ON A SPECIFIC WAVELENGTH FRAUNHOFER LINE USING A NEODYMIUM DOPED LASER TRANSMITTER

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATIONS

This application is related to copending applications Ser. Nos. 07/782,008, pending & 07/781,036, pending filed in the United States Patent and Trademark Office by Victor L. Moberg entitled "Chromium Doped Laser Transmitter of Extended Wavelength Capability", NC 73,106 and "Chromium Doped Laser Transmitter of Novel Wavelength Capability", NC 73,107.

BACKGROUND OF THE INVENTION

Existing laser transmitters for optical communication and ranging applications operate at wavelengths already occupied by the high background noise of the solar spectrum, making reception difficult. For undersea and sea-surface penetrating applications existing systems use dye lasers with material lifetime problems and expensive secondary optical pumping lasers, or xenon chloride excimer lasers with toxic-corrosive gases and 1300° C. lead vapor Raman cells, or frequency doubled solid-state neodymium based lasers operating far from the peak transmission band for blue-ocean seawater, or low peak-power 1500° C. copper vapor lasers. A comparatively simple solid-state high peak-power laser transmitter operating at the minimum solar background and highly blue-ocean penetrating calcium g Fraunhofer line would be an improvement in the state of the art of laser communication and ranging systems. This is particularly true if the laser is efficiently and reliably diode pumped and wavelength matched to a calcium atomic resonance filter also on the calcium g Fraunhofer line.

Thus a need currently exists in the state of the art for an improvement in laser communications and ranging systems 11 using a comparatively simple neodymium solid-state high peak-power laser transmitter operating at selective wavelengths of minimum solar background radiation and maximum seawater transmission.

SUMMARY OF THE INVENTION

A neodymium doped solid-state high peak-power laser transmitter emits at the 4226.75 Angstrom calcium g Fraunhofer line or other blue or blue-green Fraunhofer lines which are lines of minimum solar radiation and high ocean transmission. A glass or alternatively YAG laser host medium is appropriately doped with neodymium ions, optically pumped, temperature stabilized, and resonator cavity tuned to permit lasing on select infrared wavelengths within the $R_2 > Y_3$ or, alternatively, $R_1 > Y_1$ transitions. The cavity tuning means selects a laser oscillator emission wavelength for neodymium doped glass on the $R_2 > Y_3$ transition of 10594.6413 Angstrom, or alternatively an emission wavelength for Nd:YAG on the $R_2 > Y_3$ transition of 10643.5404 Angstrom, or 10644.2961 Angstrom, or 10644.9411 Angstrom, or 10645.6968 Angstrom, or 10638.3963 Angstrom, or 10635.3204 Angstrom, or 10640.2725 Angstrom, or 10642.2711 Angstrom, or 10647.7053 Angstrom or alternatively an emission wavelength for Nd:YAG on the $R_1 > Y_1$ transition of 10614.6531 Angstrom, or 10613.9019 Angstrom, or 10615.8027 Angstrom or particular wavelength of interest are dispersively suppressed 11 by the cavity tuning means to ensure single wavelength operation. The laser oscillator is Q-switched, the beam amplified, and the resulting high peak-power output is frequency tripled to the ultraviolet. For the above listed wavelengths of interest, the frequency tripled wavelength for Neodymium doped glass on the $R_2 > Y_3$ transition is 3531.547 Angstrom, or, for Nd:YAG on the $R_2 > Y_3$ transition, it is respectively 3547.8468 Angstrom, or 3548.0987 Angstrom, or 548.3137 Angstrom, or 3548.5656 Angstrom, or 3546.1321 Angstrom, or 3545.1068 Angstrom, or 3546.7575 Angstrom, or 547.4237 Angstrom or 3549.2351 Angstrom, or, for Nd:YAG on the $R_1 > Y_1$ transition, it is respectively 3538.2177 Angstrom, or 537.9673 Angstrom, or 3538.6009 Angstrom or 3537.683 Angstrom. The frequency tripled wavelength is next frequency down-shifted in a specific Raman cell medium by a specific number of Raman Stokes-shifts to result in laser transmitter output on the desired Fraunhofer line wavelength. For the above listed fundamental and respective frequency tripled wavelengths of interest, the Raman down-shifting means for Neodymium doped glass on the $R_2 > Y_3$ transition is 4656 cm$^{-1}$ shift to the third-Stokes in oxygen to a 4226.75 Angstrom calcium g Fraunhofer line output, or, for Nd:YAG on the $R_2 > Y_3$ transition, it is respectively 4656 cm$^{-1}$ shift to the third-Stokes in oxygen to a 4250.120 Angstrom iron Fraunhofer line output, or 4654 cm$^{-1}$ shift to the second-Stokes in nitrogen to a 4250.12 Angstrom iron Fraunhofer line output, or 4656 cm$^{-1}$ shift to the third-Stokes in oxygen to a 4250.79 Angstrom iron Fraunhofer line output, or 4654 cm$^{-1}$ shift to the second-Stokes in nitrogen to a 4250.79 Angstrom iron Fraunhofer line output, or 5772 cm$^{-1}$ shift to the second-Stokes in HCl to a 4459.1 Angstrom iron Fraunhofer line output, or 8748 cm$^{-1}$ shift to the third-Stokes in methane to a 5139.450 Angstrom iron Fraunhofer line output, shift to the third-Stokes in methane to a 5142.92 Angstrom iron Fraunhofer line output, or 8973 cm$^{-1}$ shift to the third-Stokes in deuterium to a 5204.58 Angstrom chromium Fraunhofer line output, or 8973 cm$^{-1}$ shift to the third-Stokes in deuterium to a 5208.48 Angstrom chromium Fraunhofer line output, or, for Nd:YAG on the $R_1 > Y_1$ transition, it is respectively 4654 cm$^{-1}$ shift to the second-Stokes in nitrogen to a 4235.950 Angstrom iron Fraunhofer line output, or 4656 cm$^-$ shift to the third-Stokes in oxygen to a 4235.950 Angstrom iron Fraunhofer line output, or 5832 cm$^{-1}$ shift to the second-iron Stokes in methane to a 4459.1 Angstrom iron Fraunhofer line output, or 8973 cm$^{-1}$ shift to the third-Stokes in deuterium to a 5183.64 Angstrom magnesium Fraunhofer line output. These blue and blue-green Fraunhofer line wavelengths provide for better undersea communications and ranging with reduced solar background noise.

An object of the invention is to provide for improved optical communications and ranging systems operating in sunlight by using wavelengths at which solar background illumination is minimized.

Another object is to provide an apparatus and method for improved optical communications and ranging relying on the neodymium doped laser transmitter } emission at select Fraunhofer line wavelengths exhibiting less than 20 percent of the intensity of the average solar background as well as exhibiting excellent transmission through seawater, making it particularly useful for undersea or sea-surface penetrating applications.

Another object is to provide an apparatus and method for improved optical communications and ranging systems relying upon a moderately frequency stabilized solid state neodymium doped laser transmitter, a frequency tripler and a Raman down-shifting converter.

Yet another object is to provide an apparatus and method for improved optical communications and ranging that avoids critical milli-Angstrom wavelength control and exotic atomic resonance receivers heretofore relied upon for the rejection of optical noise by operating in the multi-Angstrom broad Fraunhofer line regions of minimum solar noise.

Another object of the invention is to provide an apparatus and method for improved optical communications and ranging systems which is based on existing off-the-shelf technology for creating selective Fraunhofer line transmissions.

These and other objects of the invention will become more readily apparent from the ensuing specification and claims when taken in conjunction with the appended drawings.

BRIEF DESCRIPTION OF THE DRAWINGS

FIG. 12 sets forth the process for the generation of a 4235.950 Angstrom iron Fraunhofer line output.

FIG. 13 sets forth another process for the generation of a 4235.950 Angstrom iron Fraunhofer line output.

FIG. 14 sets forth the process for the generation of a 4459.1 Angstrom iron Fraunhofer line output.

FIG. 15 sets forth the process for the generation of a 5183.64 Angstrom magnesium Fraunhofer line output.

DESCRIPTION OF THE PREFERRED EMBODIMENT

Figure 1:
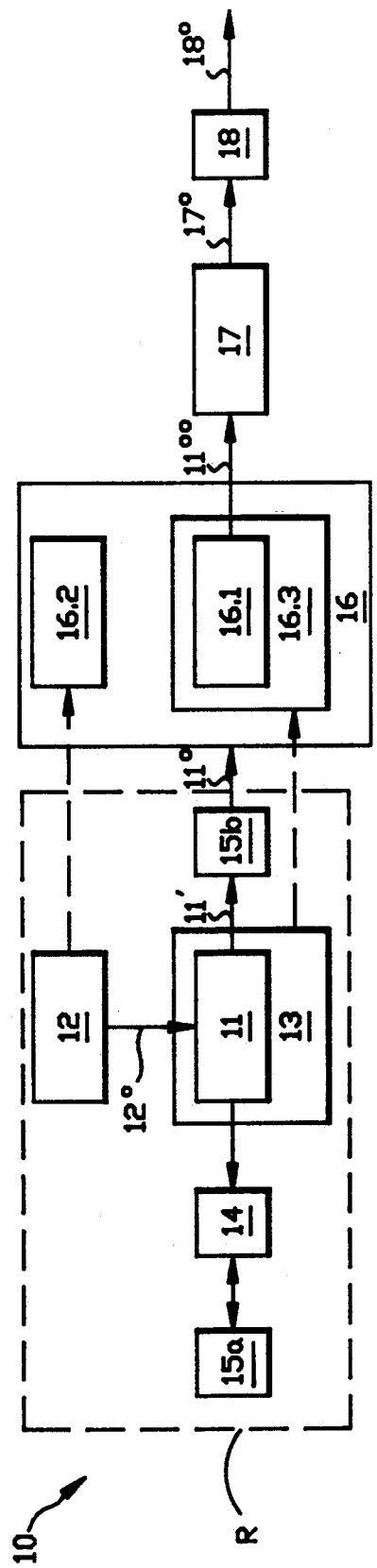
FIG. 1 is a block diagram of the principle constituents of an apparatus of this inventive concept.

Referring now to FIG. 1 of the drawings, a solid state laser transmitter 10 is capable of transmitting at a number of discrete Fraunhofer line wavelengths ranging from the blue 4226.75 Angstrom calcium g Fraunhofer line to the blue-green 5208.48 Angstrom chromium Fraunhofer line when appropriately tailored in accordance with this inventive concept. Transmitters operating at these wavelengths are of particular interest because the daytime background radiation is reduced to a fraction of the average blue-green background by the Fraunhofer lines at the wavelengths generated herein. A Fraunhofer line transmitter thus has a daytime signal-to-noise ratio which is about six times higher than an equivalent non-Fraunhofer line laser, an important factor for lidar and communications applications. These particular Fraunhofer lines are also important in undersea or sea-surface penetrating applications because they closely correspond with the 11 wavelengths of minimum optical attenuation in seawater.

Solid state laser transmitter 10 has a resonant oscillator formed of appropriate constituents to emit at a controlled single line infrared wavelength of 10594.6413, 10643.5404, 10644.2961, 10644.9411, 10645.6968, 10638.3963, 10635.3204, 10640.2725, 10642.2711, 10647.7053, 10614.6531, 10613.9019, 10615.8027 or 10613.049 Angstrom in various tailored configurations. Resonator R is provided with an appropriate Nd:YAG or $Nd^{3+}$ doped glass laser gain medium 11 driven by an appropriate pumping wavelength source 12 to operate on the neodymium $R_2 > Y_3$ or $R_1 > Y_1$ transitions. Cavity tuning between reflective elements 15a and 15b and temperature stabilization by a temperature stabilization means 13 are used to maintain specific emitted wavelengths 11°. Laser emission 11°requires switching of resonator R to a high-Q state by triggering of Q-switch 14.

Laser gain medium 11 is a glass or YAG host with neodymium ion doping. The host is shaped to permit uniform thermal regulation to within $\pm 2.0°$ C. by the active cooling system. This is facilitated through use of slab, plate, thin rod, or deeply grooved or hollow rod structures. Beam divergence of the emitted signal of interest 11' is minimized by suitable curvature of output faces to compensate for thermal effects at the operating temperature. Hoya Optics of Fremont, CA, can provide $Nd^{3+}$ doped glass slabs and Union Carbide Crystal Products of Washougal, Wa., can provide Nd:YAG rods suitable for temperature stabilized high power laser gain media.

An optical pumping source 12 provides either continuous or pulsed emissions 12° in the absorption bands of gain medium 11 to initiate lasing on the neodymium $R_2 > Y_3$ or $R_1 > Y_1$ transitions. Thermal loading and ultraviolet damage from flashlamp and other broadband pump sources are minimized by optical filtration of the pump light at pump light source 12 to remove wavelengths outside the useful neodymium absorption bands. Infrared diode pumping may be employed for increased electrical to optical efficiency. The timing of pulsed pump source 12 is synchronized with the firing of Q-switch 14 to provide maximum gain at the moment the Q-switch opens. Xenon Corp. of Woburn, Ma., provides laser pump lamps, and Spectra Diode Laboratories, Inc. of San Jose, Ca., provides high power diode laser stacks suitable for pumping $Nd^+$ doped gain media.

Active cooling system 13 maintains the temperature of gain medium 11 within $\pm 2.0°$ C. of the nominal value during operation, the precise temperature being dependent on the temperature tuning of line position of the desired transition and laser wavelength in the gain medium. Such temperature tuning curves for Nd:YAG are disclosed by T. Kushida, *Physical Review*, Vol. 185, No. 2, 10, September 1969, page 500. Temperature tuning spectra for two exemplary $Nd^{3+}$ doped glasses No. 3, September 1968, page 388. FTS Systems, Inc. of Stone Ridge, N.Y., provides the series RC-211-ULT recirculating cooler, capable of +/−0.1 degree C. temperature control over a range from −80 degrees C. to +40 degrees C., which is suitable for laser cooling and temperature regulation.

The optical resonator laser cavity of resonator R is provided with wavelength selective elements as a part of the aforementioned elements to suppress amplification of competing transitions in preference of the desired transition, and fine-tune for the specific emitted laser wavelength 11°. Resonator R is tuned for single wavelength operation by an adjustable etalon, filter, prism, grating, or other suitable wavelength selective element in the elements 15a and 15b if desired. Typical examples of such components could be the Spindler & Hoyer, Inc. of Milford, Ma., part number 336690 quartz dispersion prism and the Melles Griot, Inc. of Irvine, Ca., product number 08MLQ001/326 totally (99.5%) reflecting mirror and product number 08COB027 partially (70%) reflecting mirror. Narrow line tuning within the $R_2 > Y_3$ transition gain curve of $Nd^{+3}$ doped glass is disclosed by U. Czarnetzki and V. Schultz-von der Gathen, Applied Optics, Vol. 25, No. 17, September, 1986, page 2912. Narrow line tuning within the $R_2 > Y_3$ and $R_1 > Y_1$ transition gain curves of Nd:YAG is disclosed by J. Marling, *IEEE Journal of Quantum Electronics*, Vol. QE-14, No. 1, 1978, page 56. Locking of the laser oscillator wavelength to the desired line may also be facilitated by the injection of optical seed radiation into the resonator cavity from an external low power source, such as an optical parametric oscillator or infrared laser diode operating on the line of interest. A laser resonator favoring low or single mode, low divergence output beams is preferred, as high beam quality enhances frequency tripler 17 and Raman cell 18 conversion efficiency.

Optical Q-switch 14 is provide to spoil the Q of resonator R during buildup of population inversion and quickly permit high resonator Q at the desired time of laser emission. The Q-switch is of a saturable absorption, electro-optic, acousto-optic, or mechanical nature. The Q-switch is synchronized with pulsed pumping sources to provide maximum peak power output. Cleveland Crystals, Inc. of Cleveland Oh., provides the series QX1020 and QX1630 Pockels cells which are appropriate for Q-switching.

A neodymium-doped power amplifier 16, if used, is matched in wavelength and synchronized in timing with the resonant oscillator R and may be made up of substantially the same elements as elements 11, 12, and 13 for elements 16.1, 16.2, and 16.3 respectively. The same optical source may be used to pump both the laser oscillator and amplifier gain media, note the dotted lines in between elements 12 and 16.2 in FIG. 1, or a combination of separate closely synchronized pulse or continuous pump sources is required. Separate pump sources are normally preferred for maximum power output. The power amplifier may also share the thermal regulating system of the laser resonant oscillator R or be on a separate cooling loop, note the dotted lines in between elements 13 and 16.3 in FIG. 1.

Power amplifier 16 provides increased peak power while maintaining the low beam divergence and narrow line operation of the lower power laser oscillator. If needed, the power amplifier would be between the output of the laser oscillator resonator R and the input of a frequency tripler 17.

An optical frequency multiplier or tripler 17 utilizes one or more non-linear optic elements. The tripler is chosen for low tripling threshold, high damage threshold, and good transmission at both the fundamental and third harmonic wavelengths. The tripler converts the infrared laser pulses to the ultraviolet. A desired frequency tripling using appropriate components to be described will produce the 3531.5471, 3547.8468, 3548.0987, 3548.3137, 3548.5656, 3546.1321, 3545.1068, 3546.7575, 3547.4237, 3549.2351, 3538.2177, 3537.9673, 3538.6009 and 3537.683 Angstrom wavelengths previously listed. A typical tripler which could be included as the crystalline non-linear element(s) 17 is Lithium Triborate, $LiB_3O_5$ ("LBO") provided by Quantum Technology, Inc. of Lake Mary, Fl. A multi-element design with careful balance of fundamental doubling and mixing is generally preferred for maximum tripling efficiency. The tripler is located to receive the output $11^\infty$ from optical resonator R or power amplifier 16 and to provide the appropriate signal 17° to the input of a Raman shifter 18.

Raman shifter 18 utilizes a selective gas pressurized to several atmospheres and/or cryogenic liquid medium. It is either a single-pass device, a cascade of single-pass devices, or a device utilizing an optical resonator to reduce physical length. Efficient wavelength conversion is promoted by the use of co-propagating seed radiation of the desired Raman output wavelength, either from an external low power source such as a blue or blue-green diode laser or frequency doubled red or near-infrared diode laser, or an optical parametric oscillator, or more conveniently from an integral low power Raman oscillator receiving a fraction of the input radiation. The Raman medium, Stokes-shift number, pressure, temperature, mixture, beam focusing, and path length are optimized for the required wavelength shift. Window materials are selected for mechanical strength, high optical damage threshold, and good transmission at the appropriate input or output wavelength. HCl, methane, and deuterium gas filled Raman converters are available from Photon Interactions of Alexandria, Va. as material options on the RS-100 series Raman cells. It is advisable to place an optical isolator in the beam path before a methane Raman converter to prevent damage to components of the frequency tripler, or laser amplifier or oscillator by radiation back-scattering from the methane Raman medium. Oxygen and nitrogen Raman cells normally employ the cryogenic liquid phase and are typically custom made. An exemplary design of a Raman cell for liquid oxygen and nitrogen is disclosed by J. B. Grun et al., *Physical Review*, Vol. 180, Number 1, April 1969, page 61.

For a 4226.75 Angstrom calcium g Fraunhofer line transmitter, resonator R emits radiation 11°, of 10594.6413 Angstrom $R_2 > Y_3$ transition fluorescence generation from a gain medium 11, such as neodymium doped silicate or phosphate glass. The gain medium stores and converts the optical pump energy from pumping source 12 into fluorescent emissions at 10594.6413 Angstrom and amplifies such emissions propagating in the wavelength selective laser resonator through the process of stimulated emission. The gain medium is shaped to minimize optical thermal distortion and permit uniform thermal regulation by an active cooling/temperature stabilization system. This is typically facilitated through the use of slab, plate, thin rod, or deeply grooved or hollow rod geometries. Beam divergence is minimized by suitable curvature of output faces to compensate for thermal effects at the operating temperature. Hoya Optics of Fremont, Ca., can provide $Nd^{3+}$ doped glass slabs suitable for the high power laser gain media of this embodiment.

Optical pumping means 12 is either continuous or pulsed with sufficient emission in the useful laser gain medium pump absorption bands to initiate lasing at 10594.6413 Angstrom. The optical pump source provides the energy that the gain medium and laser resonator convert to laser emission. Thermal loading and pump induced optical damage or degradation of the gain medium are minimized by either the use of a narrow band pump source, such as a diode laser array, or by optical filtration of broadband pump light to remove or convert wavelengths outside the useful excitation bands. For pulsed pumping, pulsed pumping source 12 and the timing of Q-switch 14 are synchronized to provide maximum gain at the moment of Q-switch opening. Xenon Corp. of Woburn, MA, provides laser pump lamps, and Spectra Diode Laboratories, Inc. of San Jose, Ca., provides high power diode laser stacks suitable for pumping the $Nd^{3+}$ doped glass media of this embodiment.

Temperature stabilization means 13 may employ an active feedback controlled cooling system maintaining the gain medium at the design operating temperature. Heat is removed from the gain medium by such means as contact with a thermally controlled liquid or gaseous coolant or by conduction through a cold-finger or heat-pipe to a heat pump. A Fluorinert ® FC-84 liquid coolant based system is available from FTS Systems, Inc. of Stone Ridge, N.Y., as the series RC-211-ULT recirculating cooler, capable of $+/-0.1$ degree C. temperature control over a range from $-80$ degrees C. to $+40$ degrees C., which is suitable for laser cooling and temperature regulation in this embodiment. The actual temperature employed is determined by the $R_2 > Y_3$ transition line position versus temperature curve for the particular glass host chosen. Such temperature tuning spectra for two exemplary $Nd^{3+}$ doped glasses are disclosed by A. Kaminskii, *Soviet Physics JETP*, Vol. 27, No. 3, September 1968, page 388.

An optical switching means 14 is relied upon to spoil resonator Q during build-up of gain medium population inversion and quickly permit high resonator Q at the desired time of laser emission. The Q-switch permits the gain medium to store a maximum amount of pump energy before releasing it in a very brief burst with high peak-power. The Q-switch is the modulating element for high peak-power laser ranging and digital communication systems. Q-switches typically employ saturable absorber, electro-optic, acousto-optic, or mechanically rotating optic means. For pulsed pump sources, the Q-switch and pump pulse are synchronized to provide maximum oscillator peak-power output. Cleveland Crystals, Inc. of Cleveland Oh., provides the series QX1020 and QX1630 Pockels cells which are appropriate for Q-switching in this embodiment.

Elements 15a and 15b are included to provide a means of narrow-line laser wavelength selection employing an optical resonator laser cavity with dispersive elements to suppress emission at other than the desired wavelength. The wavelength 11° is dependent upon the transmitter output wavelength 18° and Raman conversion means 18, to be described below, employed and, for the 4226.75 Angstrom transmitter, is determined by the Equation (1) for the wavelength in Angstroms:

$$\frac{3 \times 10^8}{v + (n \times N \times S)} \quad (1)$$

where v is the inverse centimeter wavenumber expression for the transmitter wavelength (23,658.84 $cm^{-1}$ for 4226.75 Angstrom), n is the index of refraction of air which equals 1.0002926, N is the integer specifying the Raman shift Stokes number required, and S is the Raman shift in inverse centimeters of the Raman medium. The wavelength must fall within the tuning range of the laser gain medium, and the Stokes number should be kept low (three or less) for maximum conversion efficiency. For this first embodiment of the invention using an oxygen shift (1552 $cm^{-1}$) to the third-Stokes, the required wavelength is:

$$\frac{3 \times 10^8}{23658.84 + (1.0002926 \times 3 \times 1552)} = 10594.641 \text{Å} \quad (2)$$

Optical resonator R permits the build-up of oscillations at 10594.6413 Angstrom which are amplified during each pass through the gain medium. The resonator is tuned for narrow-line operation by such means as an adjustable etalon, narrow-band mirror, narrow-band filter, prism, diffraction grating, or other suitably narrow-band, low in-band loss dispersive element in association with elements 15a and 15b, if desired. The Spindler & Hoyer, Inc. of Milford, Ma., part number 336690 quartz dispersion prism and the Melles Griot, Inc. of Irvine, Ca., product number 08MLQ001/326 totally (99.5%) reflecting mirror and product number 08COB027 partially (70%) reflecting mirror would be typical resonator elements for this embodiment. Narrow line tuning within the $R_2 > Y_3$ transition gain curve of $Nd^{3+}$ doped glass is disclosed by U. Czarnetzki and V. Gathen, *Applied Optics,* Vol. 25, No. 17, September, 1986. To take full advantage of the low background cusp of the Fraunhofer line, the dispersive element must be an active device with feedback control adequate to place the laser line within 10594.6413±0.16 Angstrom. For transmitter wavelength matching to a 4226.75 Angstrom, two-GHz wide atomic resonance filter transition, as disclosed by J. Gelbwachs, *Optics Letters,* Vol. 15, No. 4, February 1990, page 236, the dispersive element must incorporate feedback control of approximately 40 times greater precision, which can be attained with a local atomic resonance filter in the feedback loop. A resonator geometry favoring low or single mode, low divergence output beams is preferred, as high beam quality enhances frequency tripling and Raman cell conversion efficiency.

Amplifier 11 provides a means of laser beam amplification, matched in wavelength and synchronized in timing with the laser resonant oscillator R. The power amplifier consists of a neodymium doped optical gain medium 16.1 such as that of the laser oscillator gain element 11, an optical pumping means 16.2 the same as or a sharing of pumping source 12, and a regulated cooling/temperature stabilization means 16.3 the same as or a sharing of element 13. Amplifier 16 is typically similar to the laser resonant oscillator R minus the Q-switch and resonator elements. The power amplifier increases the laser beam peak-power while substantially maintaining the low beam divergence and narrow-line operation of the laser oscillator.

An optical frequency tripling means 17, such as one or more crystalline non-linear optical elements, converts the 10594.6413 Angstrom laser infrared output to 3531.5471 Angstrom in the ultraviolet. The tripler must have good transmission at 10594.6413, 5297.3206, and 3531.5471 Angstrom and be able to phase match to the incoming 10594.6413 Angstrom beam. A tripler which could be included as the crystalline non-linear element(s) 17 in this embodiment is Lithium Triborate, LiB$_3$O$_5$ ("LBO") provided by Quantum Technology, Inc. of Lake Mary, Fl.

Raman converter 18, such as an oxygen Raman cell in this embodiment, utilizes stimulated scattering in a Raman medium, such as liquid or highly pressurized oxygen, to increase the wavelength of the incoming tripled laser beam to 4226.75 Angstrom, the calcium g Fraunhofer line. A Raman converter is typically either a single-pass device, a multi-pass device, or a Raman oscillator/amplifier combination of single-pass or multi-pass devices. The Raman medium pressure or concentration, composition, beam focusing optics, and path length are optimized for, in an oxygen Raman embodiment, conversion of 3531.5471 Angstrom radiation to the third-Stokes shift at 4226.75 Angstrom. Such conversion will most efficiently occur in a cryogenic liquid, rather than the gaseous phase. An exemplary design of a simple Raman cell for liquid oxygen is disclosed by J.B. Grun et al., *Physical Review*, Vol. 180, Number 1, April 1969, page 61. Efficient wavelength conversion to the calcium g Fraunhofer line is promoted by the use of co-propagating 4226.75 Angstrom seed radiation, either from an external low power source such as a blue 4226.75 Angstrom diode laser or a frequency doubled red 8453.5 Angstrom diode laser, or a 4226.75 Angstrom optical parametric oscillator, or more conveniently from an integral low power 4226.75 Angstrom Raman oscillator receiving a fraction of the 3531.5471 Angstrom input radiation.

This example provides a means for optical communications and ranging systems operating in sunlight in which performance can be improved by using the calcium g Fraunhofer line at 4226.75 Angstrom at which the solar background illumination is minimized. The calcium g Fraunhofer line at 4226.75 Angstrom is a solar absorption line exhibiting, at its cusp, less than three (3) percent the intensity of the average solar background. This line also exhibits excellent transmission through blue-ocean seawater, making it particularly useful for undersea or sea-surface penetrating applications. A calcium atomic resonance filter has been proposed which would overlap the calcium g Fraunhofer line to provide extremely high background radiation rejection, though at the expense of increased transmitter stability requirements. This basic embodiment only requires a narrow-line neodymium doped solid-state laser tuned slightly off peak wavelength, a conventional optical frequency tripler, and an oxygen Raman cell to provide high peak-power laser pulses on the calcium g Fraunhofer line. For optical communication and ranging applications, the ability to operate an all solid-state laser on an inherently low noise Fraunhofer line, which is also matched to an atomic resonance filter, makes this combination far superior to other blue and blue-green laser transmitters of similar power levels.

Having the teachings of this inventive concept in mind, an appropriate selection of components provides for generation of laser transmissions on selective Fraunhofer lines. The Fraunhofer line laser transmitter systems to be described below may employ modified laser gain medium emitters of different frequencies from resonator R with frequency multipliers (typically frequency triplers) and appropriately modified Raman frequency down-shifters to produce the desired Fraunhofer lines.

Figure 2:
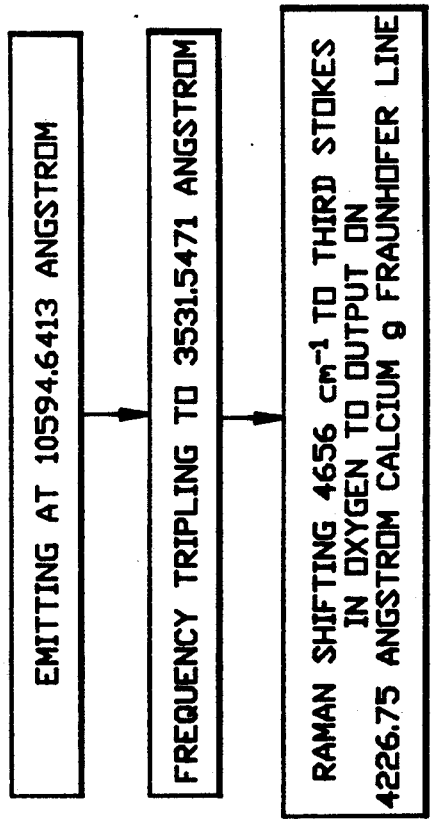
FIG. 2 sets forth the process for the generation of a 4226.75 Angstrom calcium g Fraunhofer line output.

For the neodymium $R_2 > Y_2$ transition systems:

Referring to FIG. 2, an emitted 10594.6413 Angstrom laser oscillator wavelength is generated by neodymium doped silicate or phosphate glass in an appropriate dispersive resonator R, such as is formed by the Spindler & Hoyer, Inc. part number 336690 quartz dispersion prism and a Melles Griot, Inc. product number 08MLQ001/326 totally (99.5%) reflecting mirror and product number 08COB027 partially (70%) reflecting mirror. This wavelength is fed to an appropriately tailored frequency multiplier 17 where it is frequency tripled to 3531.5471 Angstrom. Typically, this frequency tripler could be one or more crystals of Lithium Triborate, LiB$_3$O$_5$ ("LBO") as provided by Quantum Technology, Inc. The 3531.5471 Angstrom signal is frequency shifted 4656 cm$^{-1}$ to 3rd-Stokes in oxygen, preferably of cryogenic liquid phase, to provide a 4226.75 Angstrom calcium g Fraunhofer line output using a Raman frequency shifter 18, such as that disclosed by J.B. Grun et al., *Physical Review*, Vol. 180, Number 1, April 1969, page 61.

Figure 3:
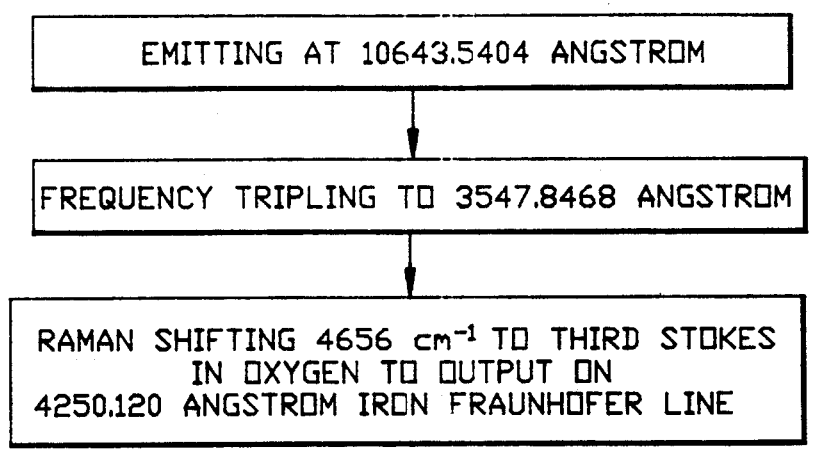
FIG. 3 sets forth the process for the generation of a 4250.120 Angstrom iron Fraunhofer line output.

Referring to FIG. 3, an emitted 10643.5404 Angstrom laser oscillator wavelength is generated by Nd:YAG in an appropriate resonator R, such as is formed by the Spindler & Hoyer, Inc. part number 336690 quartz dispersion prism and a Melles Griot, Inc. product number 08MLQ001/326 totally (99.5%) reflecting mirror and product number 08COB027 partially (70%) reflecting mirror. This wavelength is fed to an appropriately tailored frequency multiplier 17 where it is frequency tripled to 3547.8468 Angstrom. Typically, this frequency tripler could be one or more crystals of Lithium Triborate, LiB$_3$O$_5$ ("LBO") as provided by Quantum Technology, Inc. The 3547.8468 Angstrom signal is frequency shifted 4656 cm$^{-1}$ to 3rd-Stokes in oxygen, preferably of cryogenic liquid phase, to provide a 4250.120 Angstrom iron Fraunhofer line output using a Raman frequency shifter 18, such as that disclosed by J.B. Grun et al., *Physical Review*, Vol. 180, Number 1, April 1969, page 61.

Figure 4:
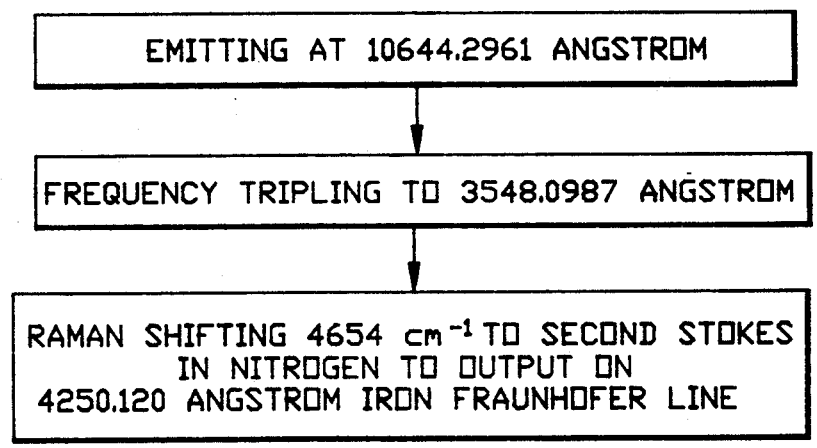
FIG. 4 sets forth another process for the generation of a 4250.120 Angstrom iron Fraunhofer line output.

Referring to FIG. 4, an emitted 10644.2961 Angstrom laser oscillator wavelength is generated by Nd:YAG in an appropriate resonator R, such as is formed by the Spindler & Hoyer, Inc. part number 336690 quartz dispersion prism and a Melles Griot, Inc. product number 08MLQ001/326 totally (99.5%) reflecting mirror and product number 08COB027 partially (70%) reflecting mirror. This wavelength is fed to an appropriately tailored frequency multiplier 17 where it is frequency tripled to 3548.0987 Angstrom. Typically, this frequency tripler could be one or more crystals of Lithium Triborate, LiB$_3$O$_5$ ("LBO") as provided by Quantum Technology, Inc. The 3548.0987 Angstrom signal is frequency shifted 4654 cm$^{-1}$ to 2nd-Stokes in nitrogen, preferably of cryogenic liquid phase, to provide a 4250.120 Angstrom iron Fraunhofer line output using a Raman frequency shifter 18, such as that disclosed by J.B. Grun et al., *Physical Review*, Vol. 180, Number 1, April 1969, page 61.

Figure 5:
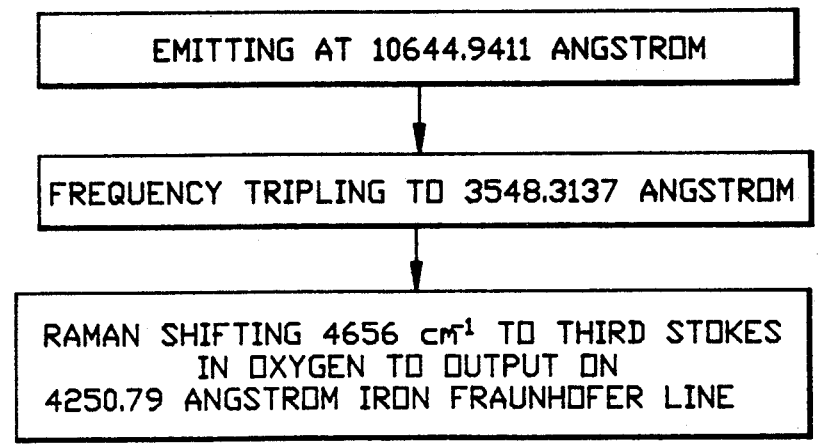
FIG. 5 sets forth the process for the generation of a 4250.79 Angstrom iron Fraunhofer line output.

Referring to FIG. 5, an emitted 10644.9411 Angstrom laser oscillator wavelength is generated by Nd:YAG in an appropriate resonator R, such as is formed by the Spindler & Hoyer, Inc. part number 336690 quartz dispersion prism and a Melles Griot, Inc. product number 08MLQ001/326 totally (99.5%) reflecting mirror and product number 08COB027 partially (70%) reflecting mirror. This wavelength generated in resonator R is fed to an appropriately tailored frequency multiplier 17 where it is frequency tripled to 3548.3137 Angstrom. Typically, this frequency tripler could be one or more crystals of Lithium Triborate, LiB$_3$O$_5$ ("LBO") as provided by Quantum Technology, Inc. The 3548.3137 Angstrom signal is frequency shifted 4656 cm$^{-1}$ to 3rd-Stokes in oxygen, preferably of cryogenic liquid phase, to provide a 4250.79 Angstrom iron Fraunhofer line output using a Raman frequency shifter 18, such as that disclosed by J. B. Grun et al., *Physical Review*, Vol. 180, Number 1, April 1969, page 61.

Figure 6:
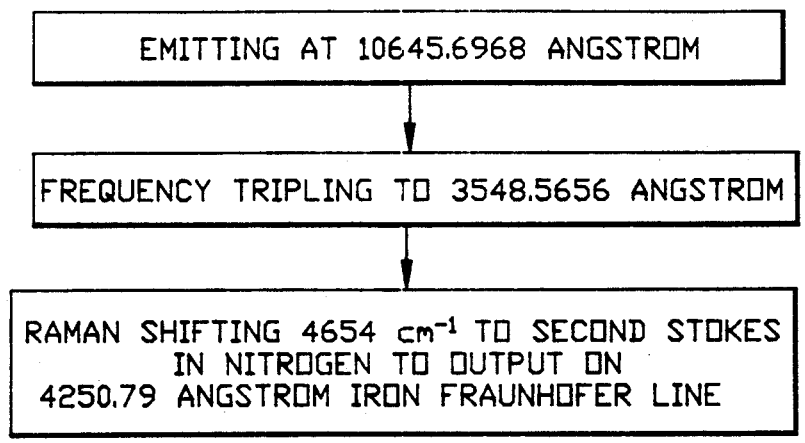
FIG. 6 sets forth another process for the generation of a 4250.79 Angstrom iron Fraunhofer line output.

Referring to FIG. 6, an emitted 10645.6968 Angstrom laser oscillator wavelength is generated by Nd:YAG in an appropriate resonator R, such as is formed by the Spindler & Hoyer, Inc. part number 336690 quartz dispersion prism and a Melles Griot, Inc. product number 08MLQ001/326 totally (99.5%) reflecting mirror and product number 08COB027 partially (70%) reflecting mirror. This wavelength generated in resonator R is fed to an appropriately tailored frequency multiplier 17 where it is frequency tripled to 3548.5656 Angstrom. Typically, this frequency tripler could be one or more crystals of Lithium Triborate, LiB$_3$O$_5$ ("LBO") as provided by Quantum Technology, Inc. The 3548.5656 Angstrom signal is frequency shifted 4654 cm$^{-1}$ to 2nd-Stokes in nitrogen, preferably of cryogenic liquid phase, to provide a 4250.79 Angstrom iron Fraunhofer line output using a Raman frequency shifter 18, such as that disclosed by J. B. Grun et al., *Physical Review*, Vol. 180, Number 1, April 1969, page 61.

Figure 7:
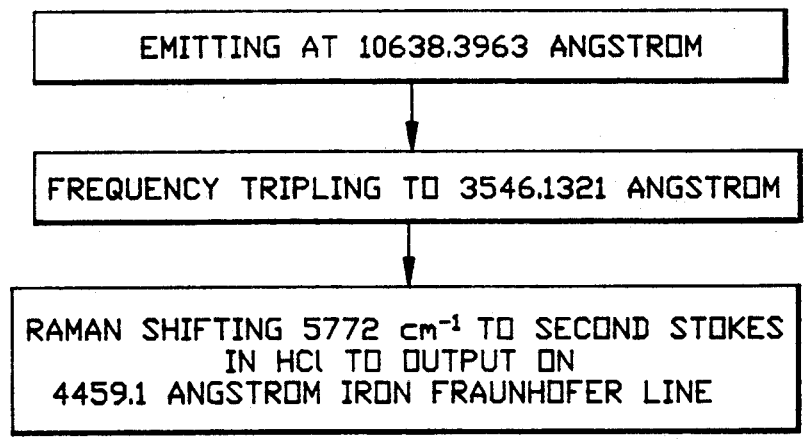
FIG. 7 sets forth the process for the generation of a 4459.1 Angstrom iron Fraunhofer line output.

Referring to FIG. 7, an emitted 10638.3963 Angstrom laser oscillator wavelength is generated by Nd:YAG in an appropriate resonator R, such as is formed by the Spindler & Hoyer, Inc. part number 336690 quartz dispersion prism and a Melles Griot, Inc. product number 08MLQ001/326 totally (99.5%) reflecting mirror and product number 08COB027 partially (70%) reflecting mirror. This wavelength generated in resonator R is fed to an appropriately tailored frequency multiplier 17 where it is frequency tripled to 3546.1321 Angstrom. Typically, this frequency tripler could be one or more crystals of Lithium Triborate, LiB$_3$O$_5$ ("LBO") as provided by Quantum Technology, Inc. The 3546.1321 Angstrom signal is frequency shifted 5772 cm$^{-1}$ to 2nd-Stokes in HCl, to provide a 4459.1 Angstrom iron Fraunhofer line output using a Raman frequency shifter 18, such as a Photon Interactions RS-100 series Raman cell with HCl fill.

Figure 8:
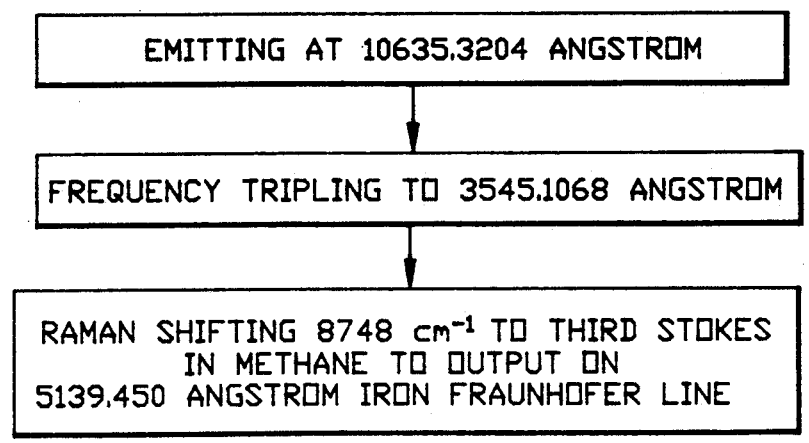
FIG. 8 sets forth the process for the generation of a 5139.450 Angstrom iron Fraunhofer line output.

Referring to FIG. 8, an emitted 10635.3204 Angstrom laser oscillator wavelength is generated by Nd:YAG in an appropriate resonator R, such as is formed by the Spindler & Hoyer, Inc. part number 336690 quartz dispersion prism and a Melles Griot, Inc. product number 08MLQ001/326 totally (99.5%) reflecting mirror and product number 08COB027 partially (70%) reflecting mirror. This wavelength generated in resonator R is fed to an appropriately tailored frequency multiplier 17 where it is frequency tripled to 3545.1068 Angstrom. Typically, this frequency tripler could be one or more crystals of Lithium Triborate, Li$_3$O$_5$ ("LBO") as provided by Quantum Technology, Inc. The 3545.1068 Angstrom signal is frequency shifted 8748 cm$^{-1}$ to 3rd-Stokes in methane, to provide a 5139.450 Angstrom iron Fraunhofer line output using a Raman frequency shifter 18, such as a Photon Interactions RS-100 series Raman cell with methane fill. Note that an optical isolator is advisable before the methane Raman cell to avoid optical component damage by back-scattered radiation.

Figure 9:
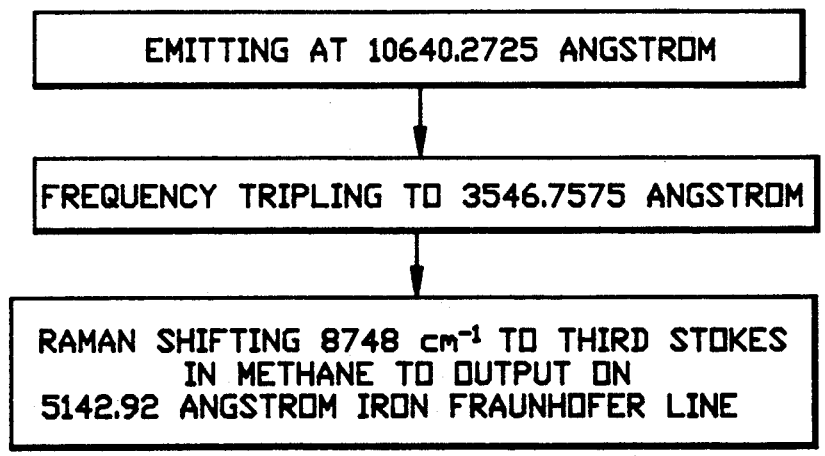
FIG. 9 sets forth the process for the generation of a 5142.92 Angstrom iron Fraunhofer line output.

Referring to FIG. 9, an emitted 10640.2725 Angstrom laser oscillator wavelength is generated by Nd:YAG in an appropriate resonator R, such as is formed by the Spindler & Hoyer, Inc. part number 336690 quartz dispersion prism and a Melles Griot, Inc. product number 08MLQ001/326 totally (99.5%) reflecting mirror and product number 08COB027 partially (70%) reflecting mirror. This wavelength generated in resonator R is fed to an appropriately tailored frequency multiplier 17 where it is frequency tripled to 3546.7575 Angstrom. Typically, this frequency tripler could be one or more crystals of Lithium Triborate, LiB$_3$O$_5$ ("LBO") as provided by Quantum Technology, Inc. The 3546.7575 Angstrom signal is frequency shifted 8748 cm$^{-1}$ to 3rd-Stokes in methane, to provide a 5142.92 Angstrom iron Fraunhofer line output using a Raman frequency shifter 18, such as a Photon Interactions RS-100 series Raman cell with methane fill. Note that an optical isolator is advisable before the methane Raman cell to avoid optical component damage by back-scattered radiation.

Figure 10:
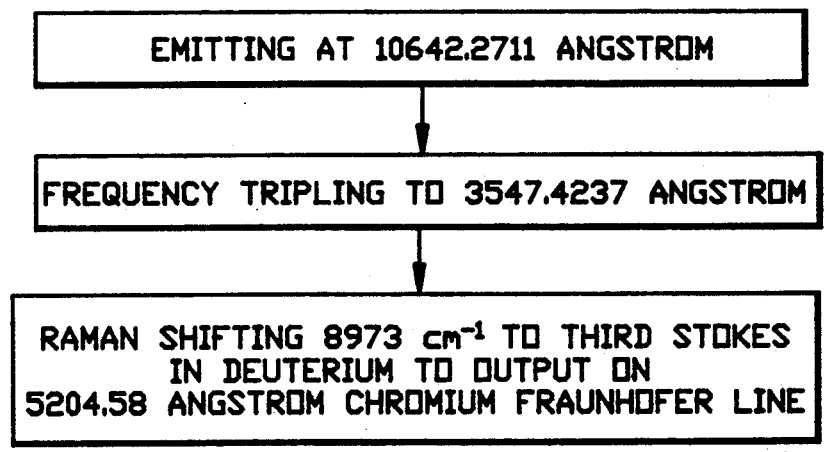
FIG. 10 sets forth the process for the generation of a 5204.58 Angstrom chromium Fraunhofer line output.

Referring to FIG. 10, an emitted 10642.2711 Angstrom laser oscillator wavelength is generated by Nd:YAG in an appropriate resonator R, such as is formed by the Spindler & Hoyer, Inc. part number 336690 quartz dispersion prism and a Melles Griot, Inc. product number 08MLQ001/326 totally (99.5%) reflecting mirror and product number 08COB027 partially (70%) reflecting mirror This wavelength generated in resonator R is fed to an appropriately tailored frequency multiplier 17 where it is frequency tripled to 3547.4237 Angstrom. Typically, this frequency tripler could be one or more crystals of Lithium Triborate, LiB$_3$O$_5$ ("LBO") as provided by Quantum Technology, Inc. The 3547.4237 Angstrom signal is frequency shifted 8973 cm$^{-1}$ to 3rd-Stokes in deuterium, to provide a 5204.58 Angstrom chromium Fraunhofer line output using a Raman frequency shifter 18, such as a Photon Interactions RS-100 series Raman cell with deuterium fill.

Figure 11:
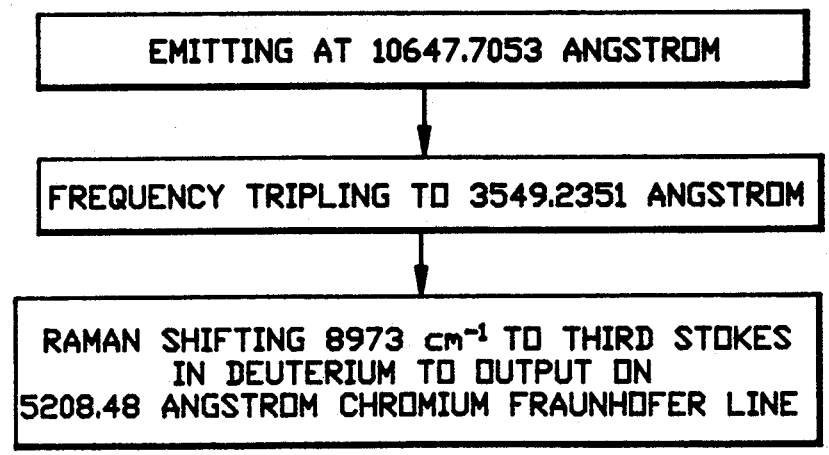
FIG. 11 sets forth the process for the generation of a 5208.48 Angstrom chromium Fraunhofer line output.

Referring to FIG. 11, an emitted 10647.7053 Angstrom laser oscillator wavelength is generated by Nd:YAG in an appropriate resonator R, such as is formed by the Spindler & Hoyer, Inc. part number 336690 quartz dispersion prism and a Melles Griot, Inc. product number 08MLQ001/326 totally (99.5%) reflecting mirror and product number 08COB027 partially (70%) reflecting mirror. This wavelength generated in resonator R is fed to an appropriately tailored frequency multiplier 17 where it is frequency tripled to 3549.2351 Angstrom. Typically, this frequency tripler could be one or more crystals of Lithium Triborate, LiB$_3$O$_5$ ("LBO") as provided by Quantum Technology, Inc. The 3549.2351 Angstrom signal is frequency shifted 8973 cm$^{-1}$ to 3rd-Stokes in deuterium, to provide a 5208.48 Angstrom chromium Fraunhofer line output using a Raman frequency shifter 18, such as a Photon Interactions RS-100 series Raman cell with deuterium fill.

For neodymium R$_1$>Y$_1$ transition systems:

Referring to FIG. 12, an emitted 10614.6531 Angstrom laser oscillator wavelength is generated by Nd:YAG in an appropriate resonator R, such as is formed by the Spindler & Hoyer, Inc. part number 336690 quartz dispersion prism and a Melles Griot, Inc. product number 08MLQ001/326 totally (99.5%) reflecting mirror and product number 08COB027 partially (70%) reflecting mirror. This wavelength generated in resonator R is fed to an appropriately tailored frequency multiplier 17 where it is frequency tripled to 3538.2177 Angstrom. Typically, this frequency tripler could be one or more crystals of Lithium Triborate, LiB$_3$O$_5$ ("LBO") as provided by Quantum Technology, Inc. The 3538.2177 Angstrom signal is frequency shifted 4654 cm$^{-1}$ to 2nd-Stokes in nitrogen, preferably of cryogenic liquid phase, to provide a 4235.950 Angstrom iron Fraunhofer line output using a Raman frequency shifter 18, such as that disclosed by J. B. Grun et al., *Physical Review*, Vol. 180, Number 1, April 1969, page 61.

Referring to FIG. 13, an emitted 10613.9019 Angstrom laser oscillator wavelength is generated by Nd:YAG in an appropriate resonator R, such as is formed by the Spindler & Hoyer, Inc. part number 336690 quartz dispersion prism and a Melles Griot, Inc. product number 08MLQ001/326 totally (99.5%) reflecting mirror and product number 08COB027 partially (70%) reflecting mirror. This wavelength generated in resonator R is fed to an appropriately tailored frequency multiplier 17 where it is frequency tripled to 3537.9673 Angstrom. Typically, this frequency tripler could be one or more crystals of Lithium Triborate, LiB$_3$O$_5$ ("LBO") as provided by Quantum Technology, Inc. The 3537.9673 Angstrom signal is frequency shifted 4656 cm$^{-1}$ to 3rd-Stokes in oxygen, preferably of cryogenic liquid phase, to provide a 4235.950 Angstrom iron Fraunhofer line output using a Raman frequency shifter 18, such as that disclosed by J. B. Grun et al., *Physical Review*, Vol. 180, Number 1, April 1969, page 61.

Referring to FIG. 14, an emitted 10615.8027 Angstrom laser oscillator wavelength is generated by Nd:YAG in an appropriate resonator R, such as is formed by the Spindler & Hoyer, Inc. part number 336690 quartz dispersion prism and a Melles Griot, Inc. product number 08MLQ001/326 totally (99.5%) reflecting mirror and product number 08COB027 partially (70%) reflecting mirror. This wavelength generated in resonator R is fed to an appropriately tailored frequency multiplier 17 where it is frequency tripled to 3538.6009 Angstrom. Typically, this frequency tripler could be one or more crystals of Lithium Triborate, LiB$_3$O$_5$ ("LBO") as provided by Quantum Technology, Inc. The 3538.6009 Angstrom signal is frequency shifted 5832 cm$^{-1}$ to 2nd-Stokes in methane to provide a 4459.1 Angstrom iron Fraunhofer line output using a Raman frequency shifter 18, such as a Photon Interactions RS-100 series Raman cell with methane fill. Note that an optical isolator is advisable before the methane Raman cell to avoid optical component damage by back-scattered radiation.

Referring to FIG. 15, an emitted 10613.049 Angstrom laser oscillator wavelength is generated by Nd:YAG in an appropriate resonator R, such as is formed by the Spindler & Hoyer, Inc. part number 336690 quartz dispersion prism and a Melles Griot, Inc. product number 08MLQ001/326 totally (99.5%) reflecting mirror and product number 08COB027 partially (70%) reflecting mirror. This wavelength generated in resonator R is fed to an appropriately tailored frequency multiplier 17 where it is frequency tripled to 3537.683 Angstrom. Typically, this frequency tripler could be one or more crystals of Lithium Triborate, LiB$_3$O$_5$ ("LBO") as provided by Quantum Technology, Inc. The 3537.683 Angstrom signal is frequency shifted 8973 cm$^{-1}$ to 3rd-Stokes in deuterium, to provide a 5183.64 Angstrom magnesium Fraunhofer line output using a Raman frequency shifter 18, such as a Photon Interactions RS-100 series Raman cell with deuterium fill.

In view of the foregoing teachings the configuration of the Raman oscillator/amplifier frequency down-converter may be varied. Efficient conversion is promoted by the use of co-propagating seed radiation of the desired Raman wavelength, either from an external source, such as a blue or blue-green diode laser or frequency doubled red or near-infrared diode laser, or parametric oscillator, or more conveniently from an integral low power Raman oscillator of the desired Fraunhofer wavelength receiving a fraction of the input radiation. The output of the oscillator would be filtered to remove vestigial lower and higher Stokes components, and used to seed a Raman amplifier cell with such beam geometry as to produce co-propagating wavefronts when the amplifier receives the suitably delayed main portion of the ultraviolet beam from the tripler. A low threshold Raman converter may be useful such as where a transmitter employs continuous optical pumping since such transmitter will generally have lower peak-power than that obtainable with a high peak-power pulsed pump source. The lower peak-power beam may require lower threshold Raman converters, such as those based on small cross-section waveguide or capillary structures or multi-pass resonator structures. Single mode, low divergence beams are required for high conversion efficiency with these low threshold Raman converters.

Some applications may call for the selection of an alternative Raman media. For example, the 3537.9673 Angstrom frequency tripled laser wavelength is applicable to a 4235.95 Angstrom iron Fraunhofer line conversion using an oxygen Raman cell at three (3) Stokes shifts. A 3538.2177 Angstrom frequency tripled laser wavelength is applicable to the same 4235.95 Angstrom iron Fraunhofer line, but using a nitrogen Raman cell at two (2) Stokes shifts. Other Raman media may have different degrees of shift and could use different Stokes orders to shift other tripled wavelengths (within the tuning capability of the laser) to the same Fraunhofer lines. Other applications may require only a single stage laser rather than the master oscillator—power amplifier (MOPA) configuration described. The optical power amplifier may be omitted for applications requiring less peak-power, provided that frequency tripler and Raman converter intensity thresholds are met. Optionally, a use may require an injection seeded laser. To obtain narrow-line operation at high peak-power, seed radiation of the desired wavelength (10594.6413 Angstrom for calcium g Fraunhofer line operation with an oxygen Raman cell) can be injected into the laser oscillator by an external low-power, continuous, narrow-line laser. This reduces or eliminates the requirements for dispersive elements within the laser oscillator cavity by providing a stable source during the build-up of stimulated emission. Injection locking combined with feedback control from a local atomic resonance filter will generally be required for communication and ranging with atomic resonance filter based receivers.

Alternative laser hosts may be selected. In addition to phosphate and silicate glasses, such crystalline materials as CaWO$_4$, PbMoO$_4$, LaNa(MoO$_4$)$_2$, 5NaF-9YF$_3$, $CaY_2Mg_2Ge_3O_{12}$, and $SrMoO_4$, exhibit laser gain at approximately 10590 Angstrom when neodymium doped and are thus potential alternative laser hosts for the invention if operating on the 4226.75 Angstrom calcium g Fraunhofer line.

Obviously, many modifications and variations of the present invention are possible in the light of the above teachings. It is therefore to be understood that within the scope of the appended claims the invention may be practiced otherwise than specifically described.

I claim:

1. A method of emitting on a specific wavelength Fraunhofer line of peak seawater transmission and minimum solar radiation comprising:
   emitting at least on a specific wavelength of an infrared transition line from a neodymium gain element in an optical resonator;
   frequency tripling the emitted infrared line from said optical resonator to a specific ultraviolet wavelength in a frequency multiplier; and
   Raman down-shifting said specific ultraviolet wavelength a predetermined degree by a predetermined number of Stokes shifts in a predetermined medium in a Raman shifter to produce a high peak-power output at said specific wavelength Fraunhofer line.

2. A method according to claim 1 in which said emitting relies on said neodymium gain element being appropriately doped and temperature stabilized to operate on a specific wavelength of the neodymium $R_2 > Y_3$ transition.

3. A method according to claim 1 in which said emitting relies on said neodymium gain element being appropriately doped and temperature stabilized to operate on a specific wavelength of the neodymium $R_1 > Y_1$ transition.

4. A method according to claim 2 in which said emitting is at 10594.6413 Angstrom, said frequency tripling is to 3531.5471 Angstrom and said Raman shifting to third-Stokes in oxygen to produce a 4226.75 Angstrom calcium g Fraunhofer line output.

5. A method according to claim 2 in which said emitting is at 10643.5404 Angstrom, said frequency tripling is to 3547.8468 Angstrom and said Raman shifting is 4656 cm$^{-1}$ to third-Stokes in oxygen to produce a 4250.120 Angstrom iron Fraunhofer line output.

6. A method according to claim 2 in which said emitting is at 10644.2961 Angstrom, said frequency tripling is to 3548.0987 Angstrom and said Raman shifting is 4654 cm$^{-1}$ to second-Stokes in nitrogen to produce a 4250.120 Angstrom iron Fraunhofer line output.

7. A method according to claim 2 in which said emitting is at 10644.9411 Angstrom, said frequency tripling is to 3548.3137 Angstrom and said Raman shifting is 4656 cm$^{-1}$ to third-Stokes in oxygen to produce a 4250.79 Angstrom iron Fraunhofer line output.

8. A method according to claim 2 in which said emitting is at 10645.6968 Angstrom, said frequency tripling is to 3548.5656 Angstrom and said Raman shifting is 4654 cm$^{-1}$ to second-Stokes in nitrogen to produce a 4250.79 Angstrom iron Fraunhofer line output.

9. A method according to claim 2 in which said emitting is at 10638.3963 Angstrom, said frequency tripling is to 3546.1321 Angstrom and said Raman shifting is 5772 cm$^{-1}$ to second-Stokes in HCl to produce a 4459.1 Angstrom iron Fraunhofer line output.

10. A method according to claim 2 in which said emitting is at 10635.3204 Angstrom, said frequency tripling is to 3545.1068 Angstrom and said Raman shifting is 8748 cm$^{-1}$ to third-Stokes in methane to produce a 5139.450 Angstrom iron Fraunhofer line output.

11. A method according to claim 2 in which said emitting is at 10640.2725 Angstrom, said frequency tripling is to 3546.7575 Angstrom and said Raman shifting is 8748 cm$^{-1}$ to third-Stokes in methane to produce a 5142.92 Angstrom iron Fraunhofer line output.

12. A method according to claim 2 in which said emitting is at 10642.2711 Angstrom, said frequency tripling is to 3547.4237 Angstrom and said Raman shifting is 8973 cm$^{-1}$ to third Stokes in deuterium to produce a 5204.58 Angstrom chromium Fraunhofer line output.

13. A method according to claim 2 in which said emitting is at 10647.7053 Angstrom, said frequency tripling is to 3549.2351 Angstrom and said Raman shifting is 8973 cm$^{-1}$ to third-Stokes in deuterium to produce a 5208.48 Angstrom chromium Fraunhofer line output.

14. A method according to claim 3 in which said emitting is at 10614.6531 Angstrom, said frequency tripling is to 3538.2177 Angstrom and said Raman shifting is 4654 cm$^{-1}$ to second-Stokes in nitrogen to produce a 4235.950 Angstrom iron Fraunhofer line output.

15. A method according to claim 3 in which said emitting is at 10613.9019 Angstrom, said frequency tripling is to 3537.9673 Angstrom and said Raman shifting is 4656 cm$^{-1}$ to third-Stokes in oxygen to produce a 4235.950 Angstrom iron Fraunhofer line output.

16. A method according to claim 3 in which said emitting is at 10615.8027 Angstrom, said frequency tripling is to 3538.6009 Angstrom and said Raman shifting is 5832 cm$^{-1}$ to second-Stokes in methane to produce a 4459.1 Angstrom iron Fraunhofer line output.

17. A method according to claim 3 in which said emitting is at 10613.049 Angstrom, said frequency tripling is to 3537.683 Angstrom and said Raman shifting is 8973 cm$^{-1}$ to third-Stokes in deuterium to produce a 5183.64 Angstrom magnesium Fraunhofer line output.

* * * * *